United States Patent
Ohkawa (10) Patent No.: US 7,912,196 B2
(45) Date of Patent: Mar. 22, 2011

(54) VOICE CONFERENCE APPARATUS, METHOD FOR CONFIRMING VOICE IN VOICE CONFERENCE SYSTEM AND PROGRAM PRODUCT

(75) Inventor: Tomoki Ohkawa, Tokyo (JP)

(73) Assignees: Pioneer Corporation, Toyko (JP); Pioneer Solutions Corporation, Tokyo (JP)

( * ) Notice: Subject to any disclaimer, the term of this patent is extended or adjusted under 35 U.S.C. 154(b) by 1027 days.

(21) Appl. No.: 11/730,067

(22) Filed: Mar. 29, 2007

(65) Prior Publication Data

US 2008/0019495 A1 Jan. 24, 2008

(30) Foreign Application Priority Data

Mar. 30, 2006 (JP) ................................ 2006-095428

(51) Int. Cl.
*H04M 3/42* (2006.01)

(52) U.S. Cl. ......... 379/202.01; 379/203.01; 379/204.01; 379/205.01; 379/206.01; 370/260; 370/261; 370/262; 370/263; 370/265; 455/415; 455/416; 455/417

(58) Field of Classification Search ............. 379/202.01, 379/203.01, 204.01, 205.01, 206.01; 370/260, 370/261, 262, 263, 265; 455/415, 416, 417
See application file for complete search history.

(56) References Cited

U.S. PATENT DOCUMENTS

| | | | |
|---|---|---|---|
| 6,404,873 B1 * | 6/2002 | Beyda et al. | 379/202.01 |
| 6,728,222 B1 * | 4/2004 | Ono | 370/260 |
| 7,428,488 B2 * | 9/2008 | Saito | 704/225 |
| 2002/0054047 A1 * | 5/2002 | Toyama et al. | 345/629 |
| 2002/0085697 A1 * | 7/2002 | Simard et al. | 379/202.01 |
| 2003/0235277 A1 * | 12/2003 | Fuller et al. | 379/88.13 |
| 2004/0174972 A1 * | 9/2004 | Amano et al. | 379/202.01 |

FOREIGN PATENT DOCUMENTS

| | | |
|---|---|---|
| JP | 2004-048329 | 2/2004 |
| JP | 2004-186870 | 7/2004 |
| JP | 2004-269498 | 9/2004 |

* cited by examiner

*Primary Examiner* — Curtis Kuntz
*Assistant Examiner* — Joseph J Nguyen
(74) *Attorney, Agent, or Firm* — Drinker Biddle & Reath LLP (57) ABSTRACT

A voice conference apparatus includes: a communication unit that transmits and receives a first voice signal to and from another apparatus via a network; an output unit that reproduces the first voice signal received by the communication unit and outputs the reproduced first voice signal as a first voice; an input unit that collects the first voice and a second voice generated by a voice source, as a second voice signal; a separating unit that separates the second voice signal into a third voice signal originated from the first voice and a fourth voice signal originated from the second voice; and a selecting unit that selects one of the third voice signal and the fourth voice signal. The communication unit transmits the one of the third voice signal and the fourth voice signal selected by the selecting unit to the other apparatus.

7 Claims, 10 Drawing Sheets

VOICE CONFERENCE APPARATUS, METHOD FOR CONFIRMING VOICE IN VOICE CONFERENCE SYSTEM AND PROGRAM PRODUCT

CROSS-REFERENCE TO RELATED APPLICATIONS

This application is based upon and claims the benefit of priority from Japanese Patent Application No. 2006-095428, filed on Mar. 30, 2006, the entire contents of which are incorporated herein by reference.

BACKGROUND

1. Field

The present invention relates to a voice conference apparatus and a method and program product for confirming voice in a voice conference system.

2. Description of the Related Art

In a voice conference apparatus or TV conference apparatus for an electronic conference system using terminals connected via a network, communication line, or the like, a method for confirming whether or not an other party can hear a voice of an own party is as follows.

JP-A-2004-186870 discloses a method for measuring a voice pressure of a voice outputted from a speaker of the other party's terminal and using the measured value as voice level information to visually display the voice level information on the own party's terminal connected via a network.

JP-A-2004-48329 discloses a sound confirmation method in a network conference system. The sound confirmation method includes reproducing received voice data, detecting a voice volume of the reproduced voice and informing the other party's terminal of the voice volume as response data.

JP-A-2005-269498 discloses a video conference system, wherein a voice output level (unit is decibel (dB)) of a voice outputted from another party's terminal is collected and the voice output level is displayed as voice quality information (representing a voice volume) on an image of an own terminal display screen.

However, in a voice confirmation method for confirming whether or not an other party can hear an own voice in the known electronic conference system, merely the voice pressure level of the voice reproduced in the other party is confirmed and it is not possible to confirm how much good quality a voice is reproduced in the other party's terminal.

For example, even when there is no problem in the voice pressure level, a desired voice quality cannot be guaranteed at the other party's terminal due to quality degradation in a communication path, a CODEC quality, or the like. That is, there is a case where an inputted voice is transmitted from an own terminal and reproduced at the other party's terminal together with different acoustics, noises, or the like, and the voice is not reproduced as much as the desired clear quality. In this case, when outputted voice pressure level is good, an abnormal in the voice quality may be not detected. In addition, even when a defect in the voice quality is detected, it is difficult to detect where the cause of the defect is according to the known voice confirmation method.

SUMMARY

An aspect of the invention provides a voice conference apparatus that confirms whether a voice inputted at own party and transmitted from the own party is reproduced at other party's terminal with desired clear voice quality; a method and program product for confirming a voice in a voice conference system.

Another aspect of the invention provides a voice conference apparatus including: a communication unit that transmits and receives a first voice signal to and from another apparatus via a network; an output unit that reproduces the first voice signal received by the communication unit and outputs the reproduced first voice signal as a first voice; an input unit that collects the first voice and a second voice generated by a voice source, as a second voice signal; a separating unit that separates the second voice signal into a third voice signal originated from the first voice and a fourth voice signal originated from the second voice; and a selecting unit that selects one of the third voice signal and the fourth voice signal. The communication unit transmits the one of the third voice signal and the fourth voice signal selected by the selecting unit to the other apparatus.

DETAILED DESCRIPTION

Hereinafter, a voice conference apparatus and a method and program product for confirming a voice in a voice conference system according to an embodiment of the invention will be described in detail with reference to drawings.

Figure 1:
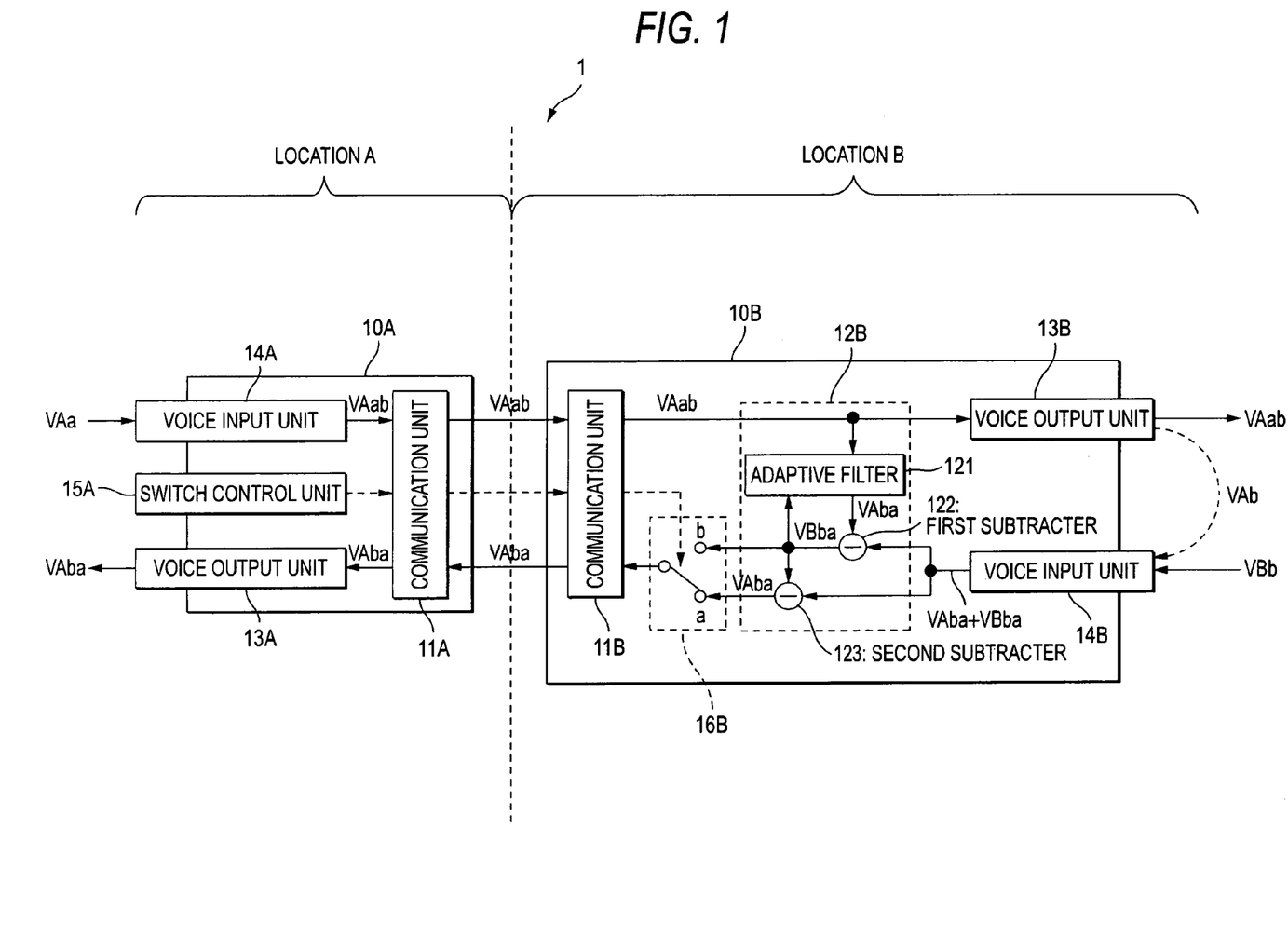
FIG. 1 is a diagram illustrating a configuration of a voice conference system according to an embodiment of the invention.

FIG. 1 is a diagram illustrating a configuration of a voice conference system according to an embodiment of the invention. According to the embodiment, in the voice conference system transmitting and receiving voice data to and from a plurality of apparatuses at locations including an location A (a first location) and a location B (a second location) connected via a network, it will be described that a voice transmitted from a voice conference apparatus 10A (a first apparatus) at the location A to a voice conference apparatus 10B (a second apparatus) at the location B (the second location) is confirmed.

In a voice conference system 1 shown in FIG. 1, the voice conference apparatus 10A has a communication unit (communication unit) 11A, a voice output unit (output unit) 13A, a voice input unit (input unit) 14A, and a switch control unit (selecting unit controller) 15A. In addition, the conference system 10B has a communication unit (communication unit) 11B, a desired voice extracting unit (separating unit) 12B, a voice output unit (output unit) 13B, a voice input unit (input unit) 14B, and a switch (selecting unit) 16B.

Further, the voice conference apparatus 10A at the location A and the voice conference apparatus 10B at the location B may have the similar configuration. In this case, the voice conference apparatus 10A may further include a desired voice extracting unit and a switch (selecting unit) (not shown), in addition to the above-described configuration and the voice conference apparatus 10B may further include a switch control unit (switching unit controller) (not shown) in addition to the above-described configuration. In such a configuration, when the voice conference apparatus 10A at the location A and the voice conference apparatus 10B at the location B have the similar configuration, a voice transmitted from the voice conference apparatus 10B at the location B to the voice conference apparatus 10A at the location A can be confirmed in a similar manner.

The desired voice extracting unit 12B includes an adaptive filter 121, a first subtracter 122, and a second subtracter 123. The desired voice extracting unit 12B carries out an echo cancellation function of removing an echo component VAba from a voice signal VAba+VBba inputted to the voice conference apparatus 10B at the location B and an echo extraction function of extracting the echo component VAba of a voice signal VAab transmitted from the voice conference apparatus 10A from the voice signal VAba+VBba.

The component VBba is a voice signal in which the voice input unit 14B collects and inputs a voice VBb (for example, a voice or sound of persons in a conference room at the location B) generated from a voice source at the location B. The voice signal VAab transmitted from the voice conference apparatus 10A at the location A are reproduced and outputted from the voice output unit 13B. A voice VAb is a voice just before the voice input unit 14B collects the voice or an attenuated voice of the reproduced and outputted voice signal VAab from the voice output unit 13B.

In addition, the voice signal VAba is generated from the voice VAb and the voice signal VAba which is collected together when the voice input unit 14B collects the voice VBb.

The voice conference apparatus 10A has the switch control unit 15A, can transmit a control signal from the switch control unit 15A using the communication units 11A and 11B, and can be controlled the switch 16B by the control signal. Accordingly, the voice conference apparatus 10A can switch to any one of the echo cancellation function and echo extraction function of the voice conference apparatus 10B.

Figure 2:
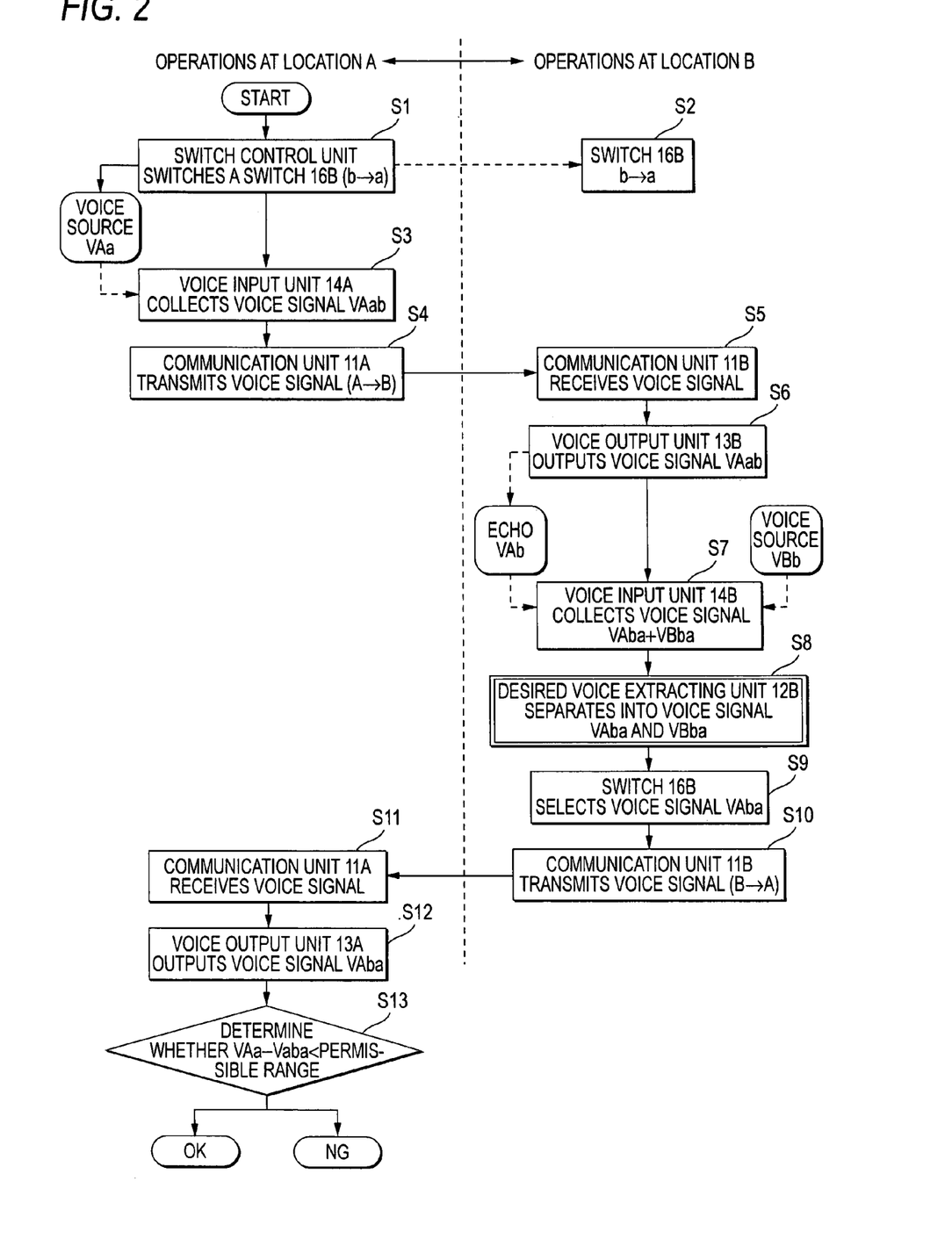
FIG. 2 is a flowchart explaining a method for confirming a voice in the voice conference system using the voice conference apparatus according to the embodiment of the invention.

FIG. 2 is a flowchart explaining a method for confirming a voice in the conference system using the voice conference apparatus according to the embodiment of the invention.

First, when it is confirmed whether or not the voice VAa (for example, a voice or sound of a person in a conference room at the location A) inputted from the location A is normally reproduced at the location B, a switch control unit switches and selects the switch 16B from b to a (step S1)

At the location B, the control signal is received from the switch control unit at the location A, and then the switch 16B is switched from b to a (step S2). When the switch 16B is switched to b, the known echo cancellation function of the voice conference apparatus extracts the voice component VBba at the location B from the voice signal VAba+VBba inputted in the location B. In contrast, when the switch 16B is switched to a, the voice component VAba is extracted at the location A from the voice signal VAba+VBba inputted at the location B.

Next, the voice input unit 14A collects the voice VAa generated by a voice source at the location A (step S3). The collected voice is transmitted as the voice signal VAab from the communication unit 11A of the voice conference apparatus 10A (step S4). The transmitted voice signal VAab is received by the communication unit 11B of the voice conference apparatus 10B (step S5), and then is outputted from the voice output unit 13B (step S6).

Next, the voice signal VAab outputted from the voice output unit 13B is collected as an echo VAb by the voice input unit 14B (step S7). The voice VBb generated by the voice source at the location B is also collected together by the voice input unit 14B, which is the original function.

The desired voice extracting unit 12B separates the collected voice signal VAba+VBba into the voice components VAba and VBba (step S8).

Figure 3:
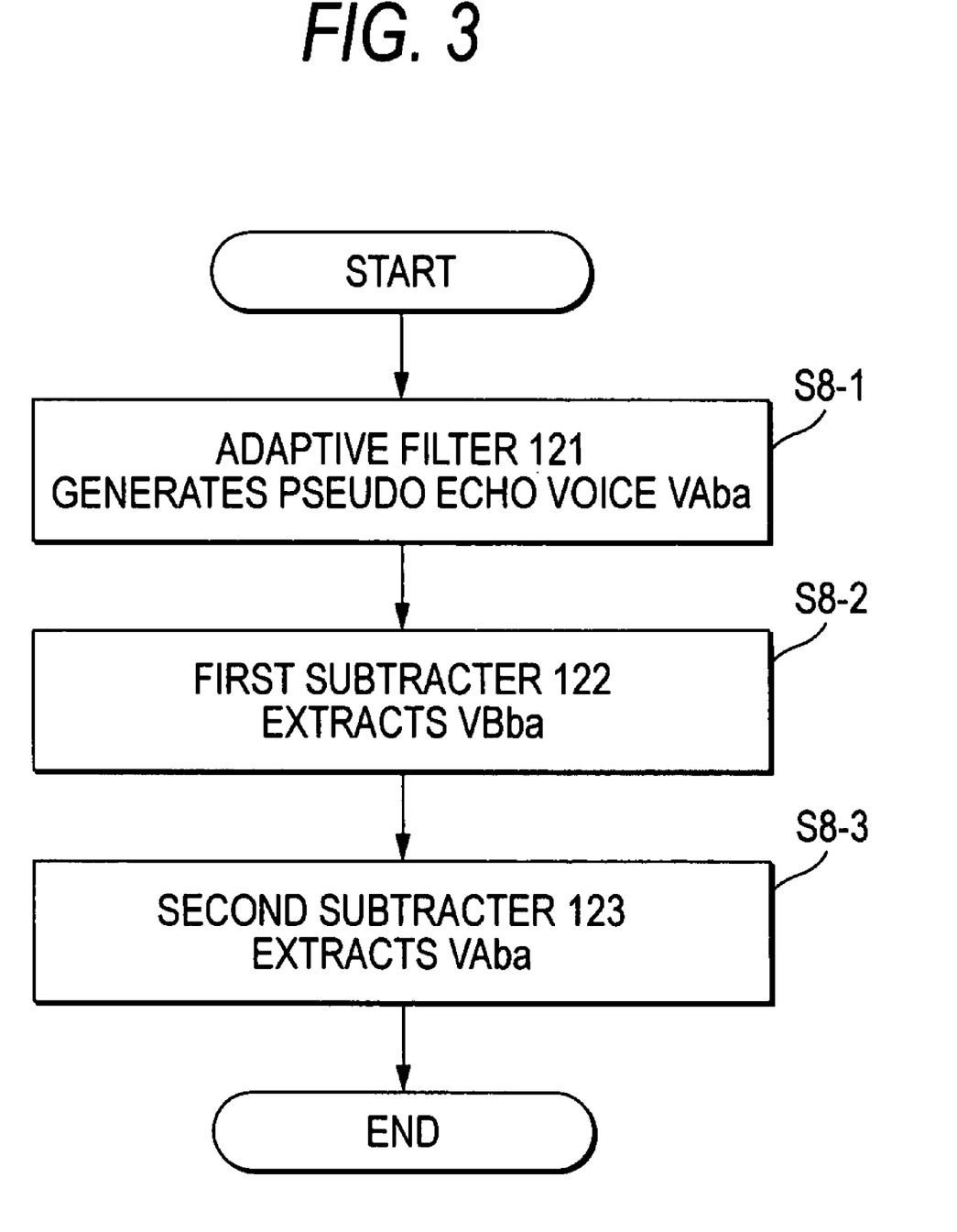
FIG. 3 is a flowchart explaining separate sequences of step S8 in FIG. 2.

The sequence of separation in step S8 will be described with reference to FIG. 3. The adaptive filter 121 in the desired voice extracting unit 12B generates a pseudo-echo in order to remove the echo component VAba from the voice signal VAab at the location A and the voice component VBba extracted by the first subtracter 122 (step S8-1).

Strictly speaking, the pseudo-echo does not have the same value as the echo component VAba of the voice signal VAba+VBba inputted in the location B. However, since the technology on the echo cancellation is the known technology, the explanation will be omitted and it is considered that the generated echo has the same value as the echo component VAba for a brief explanation.

The first subtracter 122 subtracts the pseudo-echo component VAba generated in the adaptive filer 121 from the voice signal VAba+VBba inputted in the location B to extract the voice component VBba generated at the location B (step S8-2)

The second subtracter 123 subtracts the voice component VBba extracted in the first subtracter 122 from the voice signal VAba+VBba inputted at the location B to extract the echo component VAba of the voice generated from the voice source at the location A (step S8-3).

The sequence of extracting the voice component is just one example. Any method of extracting the echo component VAba of the voice generated from the voice source at the location A and the voice component VBba generated in the location B from the input voice VAba+VBba can be used.

The flowchart of FIG. 2 will be described again.

Since the switch 16B has already switched to a in steps S1 and S2, the desired voice extracting unit 12B selects the echo component VAba from the voice components VAba and VBba separated in the desired voice extracting unit 12B (step S9). The echo component VAba is transmitted from the communication unit 11B to the communication unit 11A (step S10). The echo component VAba transmitted from the communication unit 11B is received by the communication unit 11A (step S11) and the received echo component VAba is outputted from the voice output unit 13A (step S12).

According to the above-described sequences, the voice signal VAab at the location A reproduced at the location B returns to the location A as the echo component VAba in order to confirm and determine whether or not the voice is normally reproduced in the location B (step S13).

As for a determining method, for example, a method of human hearing and a method in which when a difference is in a permissible range by comparing voice waveforms of the echo component VAba outputted from the voice output unit 13A and the input voice VAa, there is no problem (OK) are used depending on a situation or determination accuracy.

When the determination result has no problem (OK), it can be determined that the voice inputted from the location A is normally outputted in the location B.

The condition that the determination result has no problem (OK) may satisfy the relation, VAa≈VAab≈VAb≈VAba. Accordingly, it is desirable that the voice conference system according to the embodiment may be extended to meet the condition.

The method of meeting the condition is not particularly limited, but an example of the method will be described below.

First, in order to guarantee the condition VAa≈VAab, it is conceivable that a change in the voice level through the transmission path from the communication unit 11A to the communication unit 11B is compensated, for example. Likewise, in order to guarantee the condition VAb≈VAba, it is conceivable that a change in the voice level through the transmission path from the communication unit 11B to the communication unit 11A is compensated, for example.

Figure 4:
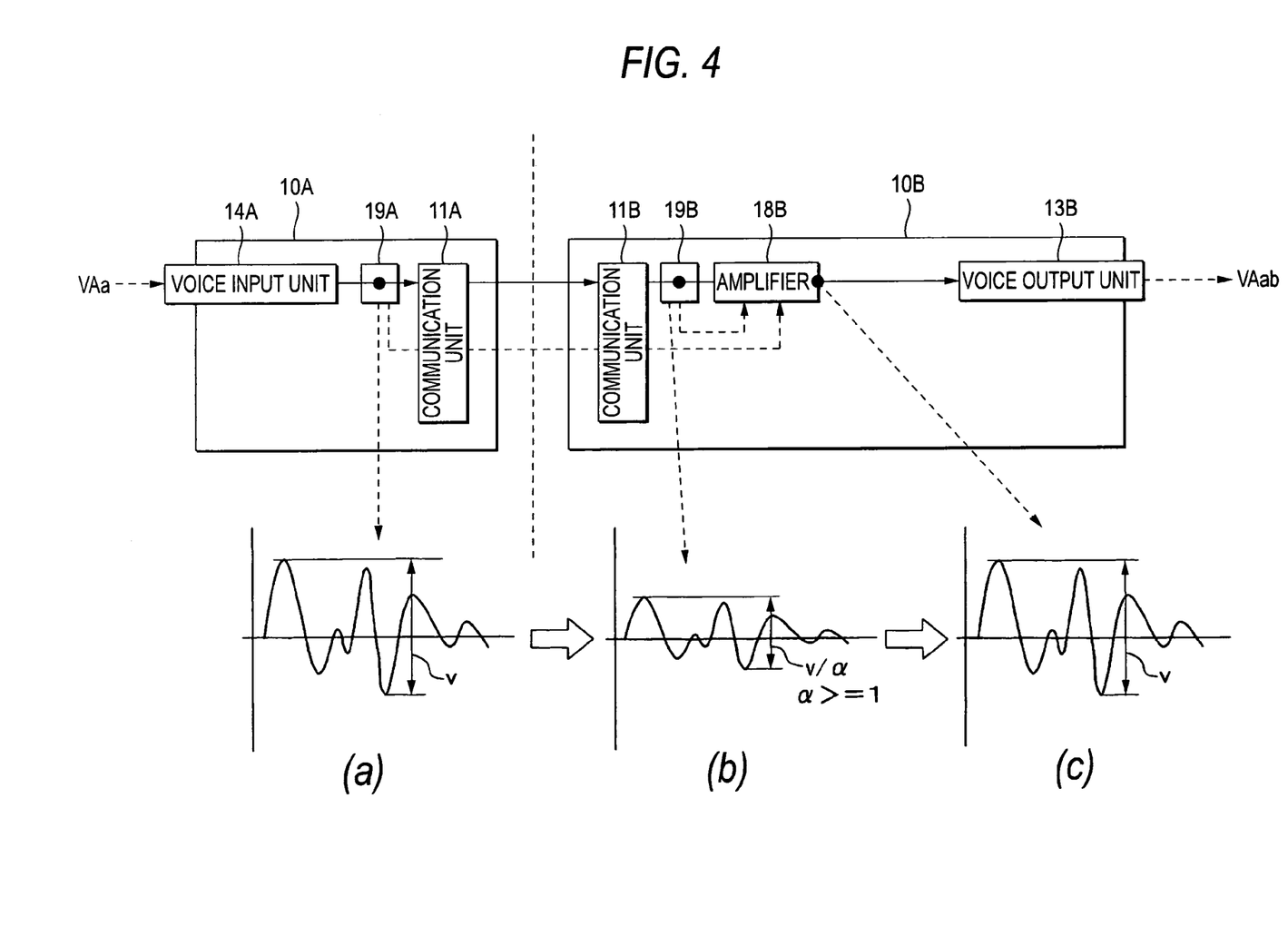
FIG. 4 is a diagram illustrating a technique wherein the voice level is measured in advance before transmission, and then the attenuated voice level is amplified as much as the measured voice level at the time of receiving the voice.

FIG. 4 is a diagram illustrating a technique wherein the voice level is measured in advance before transmission, and then the attenuated voice level is amplified as much as the measured voice level at the time of receiving the voice.

As shown in FIG. 4, a voice level-measuring unit 19A measures the voice level of the transmitted voice signal in advance.

The measured voice level is represented as V for convenience sake. The measured voice signal is transmitted to the communication unit 11B via the communication unit 11A. A voice level-measuring unit 19B measures the received voice signal in the voice conference apparatus 10B.

In this event, the measured voice level is represented as V/α for convenience sake. Sequentially, an amplifier 1 amplifies the voice signal. How much the voice level is amplified is determined by a value obtained from the voice level-measuring units 19A and 19B (amplified by α times in the example shown in FIG. 4).

In addition, a noise removing unit that removes noise of the transmission path can be provided.

A voice level-measuring unit that measures the voice level of the voice VAa and adjusts the voice level of the voice to be outputted to the voice output unit 13B at the location B to the voice level VAab may be provided.

To approximate the voice levels, that is, to guarantee the condition VAab≈VAb is achieved by returning the echo VAb to the location A in the embodiment of the invention. However, the voice level of the echo VAb is actually attenuated depending on a distance between the voice output unit 13B and the voice input unit 14B.

Figure 5:
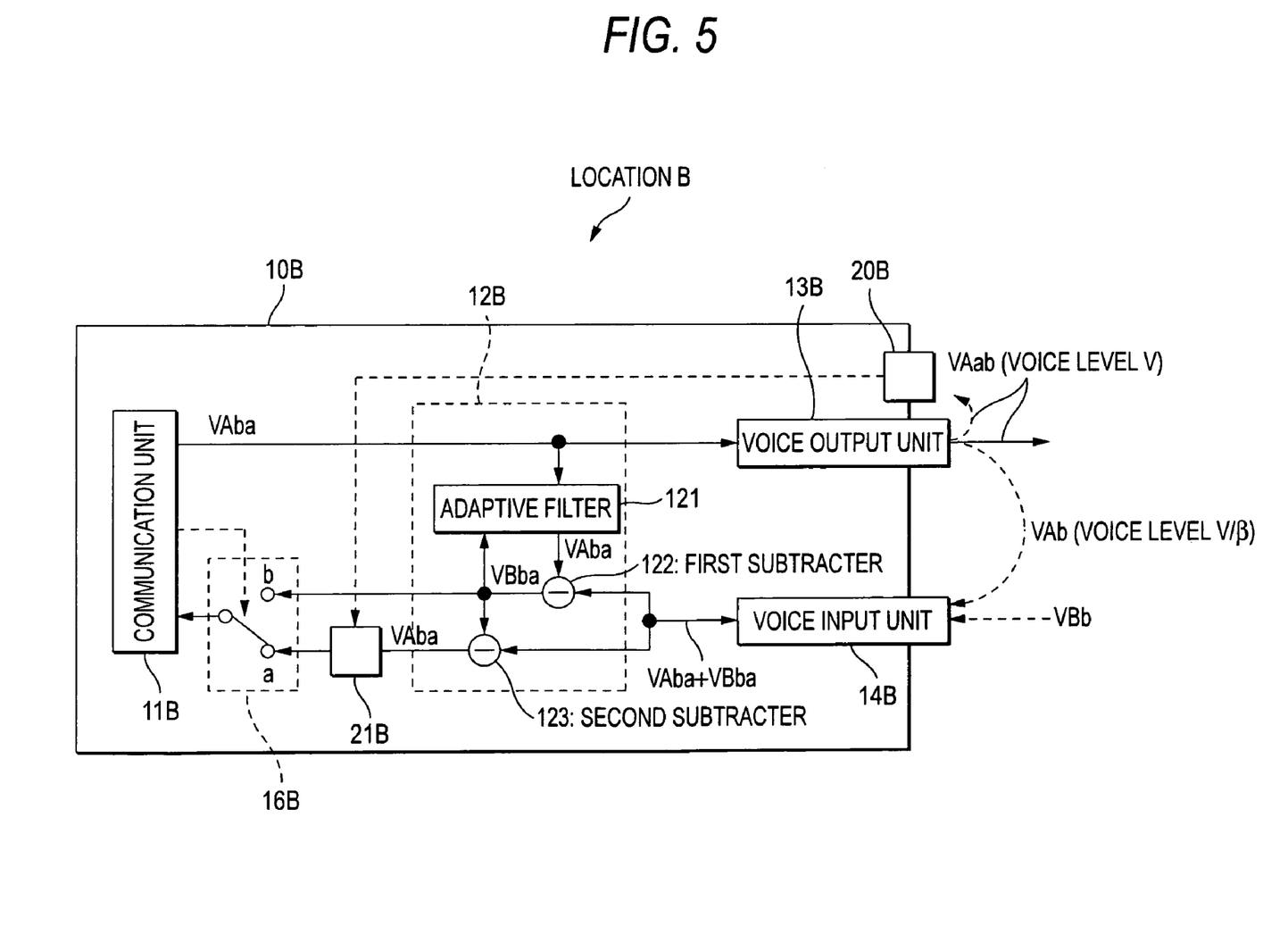
FIG. 5 is a diagram illustrating an example of amplifying the voice signal.

Accordingly, the voice level of the voice signal VAab is measured in advance at the time of outputting the voice signal from the voice output unit 13B so as to become VAab≈VAb, and then the voice component VAba extracted from the desired voice extracting unit 12B is amplified as much as the voice level of the voice signal VAab.

FIG. 5 is a diagram illustrating an example amplifying the voice signal so as to become VAab≈VAb.

As shown in FIG. 5, the voice level of the voice signal VAab outputted from the voice output unit 13B is measured by a second voice level-measuring unit 20B.

In addition, the second voice level-measuring unit 20B is disposed near the voice output unit 13B in which the voice level of the voice signal VAab is not attenuated. The voice level of the voice signal VAab is represented as V for convenience sake.

The voice level of the output voice signal VAab is attenuated and is inputted to the voice input unit 14B. When the voice signal VAab is inputted, the voice level of the echo VAb is represented as V/β for convenience sake. The echo component VAba is extracted from the voice inputted by the voice input unit 14B in the desired voice extracting unit 12B. The extracting echo is amplified by the second amplifier 21B until the level measured by the second voice level-measuring unit 20B. That is, in this event, the extracting echo is amplified by β times.

When a headset and the like are used as the voice output unit 13B, an echo does not occur at all. Accordingly, when the effect is confirmed, the voice output unit 13B and voice input unit 14B may be shorted, for example.

Figure 6:
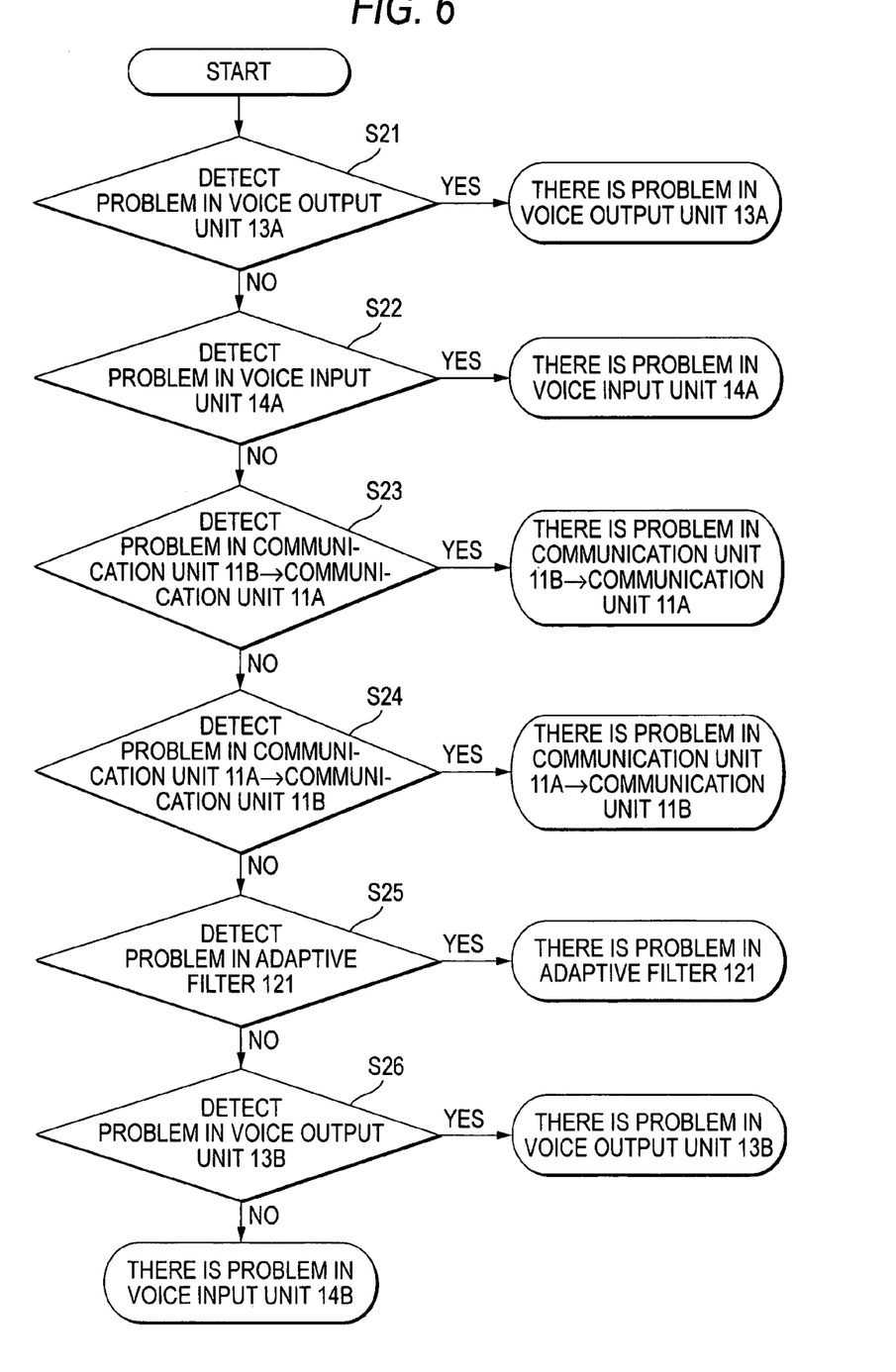
FIG. 6 is a flowchart illustrating an example of sequences for detecting where a problem is in the voice conference system using the voice conference apparatus according to the embodiment of the invention.

That is, a voice input unit that input voice to the voice input unit 14B may be provided, so that the voice signal VAab generated by the voice output unit 13B become VAab≈VAb, In addition, when the result is determined to have a problem (NG), it is easy to detect where the problem occurs and to specify what the problem is in the voice conference system by extending the configuration according to the embodiment of the invention. Hereinafter, in the voice conference system using the voice conference apparatus according to the example of the invention, an example of sequences for detecting where the problem is at the time of confirming the voice will be described with reference to FIG. 6. FIG. 6 is a flowchart illustrating the example of the sequences for detecting where the problem is.

The sequence for detecting the problem in the specific unit described below is not limited to following methods of detecting the problem, but other method may be applied.

(1) Voice Output Unit 13A

Figure 7:
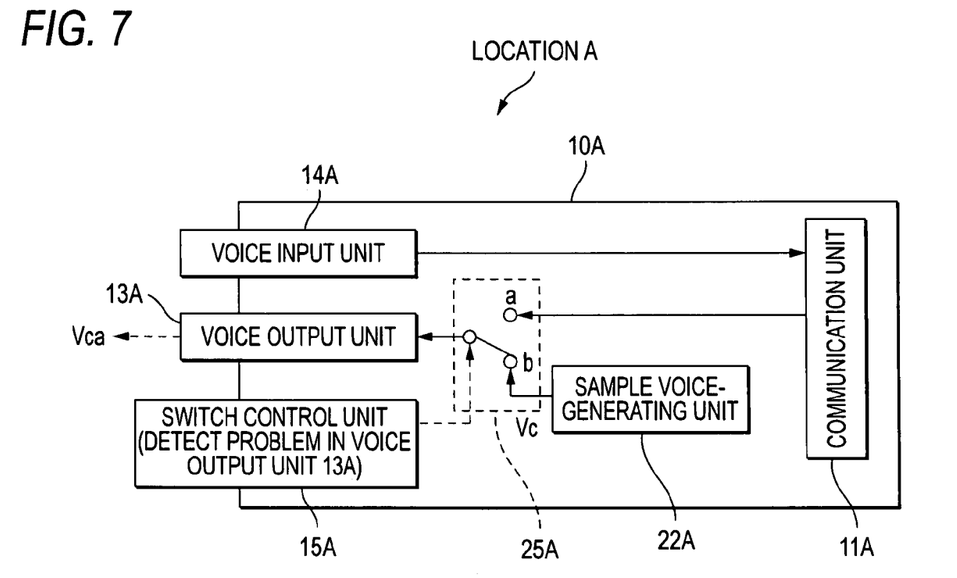
FIG. 7 is a diagram illustrating a method for detecting a problem in the voice output unit.

First, a sequence for detecting a problem is executed in the voice output unit 13A as shown in FIG. 6 (step S21). FIG. 7 is a diagram illustrating a method of detecting the problem in the voice output unit 13A.

As shown in FIG. 7, a sample voice-generating unit 22A is provided in the voice conference apparatus 10A.

When the sample voice-generating unit 22A is executed, the switch control unit 15A is controlled and a switch 25A is switched so that a sample voice (voice pressure) Vc is outputted by the voice output unit 13A.

In this event, the outputted voice (voice pressure) is represented as Vca. The voice pressures Vc and Vca are compared, and then when the difference is in the permissible range, it is determined that there is no problem in the voice output unit 13A and when the difference is out of the permissible range, it is determined that there is a problem in the voice output unit 13A.

(2) Voice Input Unit 14A

Figure 8:
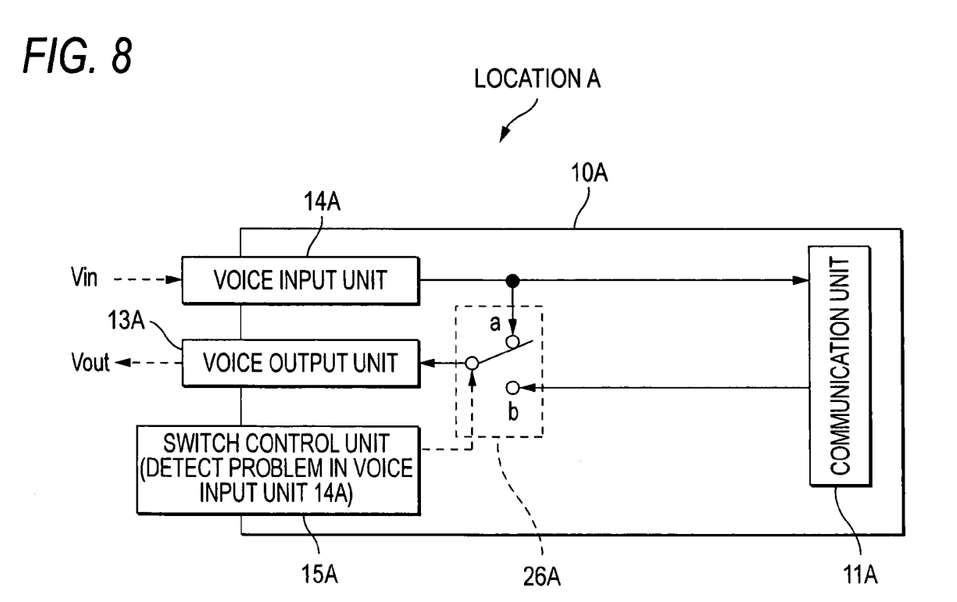
FIG. 8 is a diagram illustrating a method for detecting a problem in the voice input unit.

Next, a sequence for detecting the problem is executed in the voice input unit 14A as shown in FIG. 6 (step S22). FIG. 8 is a diagram illustrating a method of detecting the problem in the voice input unit 14A.

When it is determined that there is no problem in the voice output unit 13A in the check (1), a voice Vin is inputted to voice input unit 14A, the switch control 15A is controlled, a switch 26A is switched, the Vin is loop-backed, and then the Vin is outputted from voice output unit 13A in FIG. 8. The outputted voice Vout and Vin are compared, and then when the difference is in the permissible range, it is determined that there is no problem in the voice input unit 14A and when the difference is out of the permissible range, it is determined that there is a problem.

(3) Communication Unit 11B to Communication Unit 11A

Next, a sequence of detecting the problem is executed in the communication unit 11B to the communication unit 11A as shown in FIG. 6 (step S23).

Figure 9:
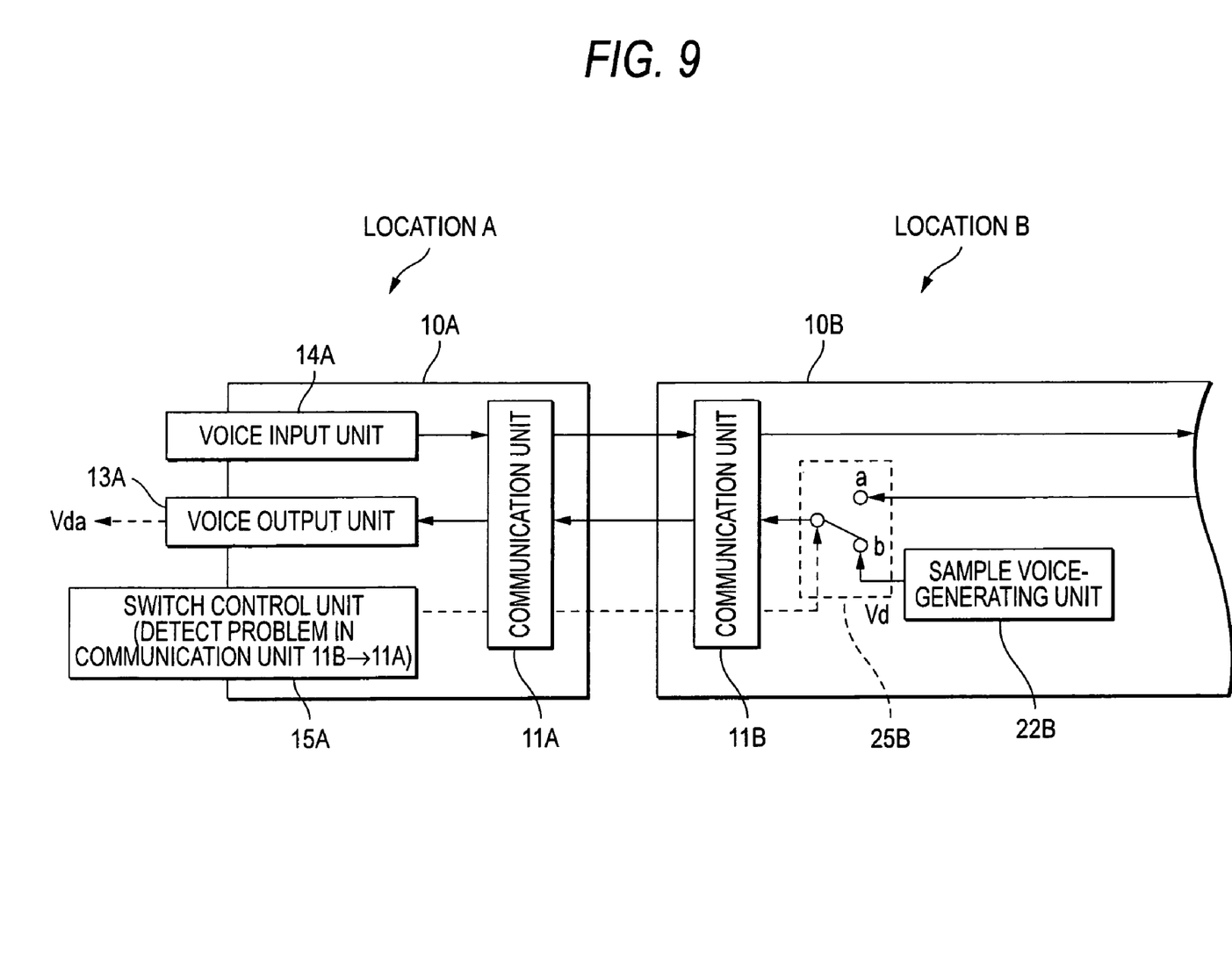
FIG. 9 is a diagram illustrating a method for detecting a problem between the communication units.

FIG. 9 is a diagram illustrating a method of detecting the problem in the communication unit 11B to the communication unit 11A.

When a sample voice-generating unit 22B is provided in the voice conference apparatus 10B to perform the problem detection, the switch control unit 15A is controlled, the switch 25B is switched to b, a sample voice (voice pressure) Vd passes from the communication unit 11B to the communication unit 11A, and then the sample voice Vd is outputted from the voice output unit 13A.

In this event, the outputted voice (voice pressure) is represented as Vda. The sample voice Vd and the outputted voice Vda are compared, and then when the difference is in a permissible range, it is determined that there is no problem in the communication unit 11B to the communication unit 11A and when the difference is out of the permissible range, it is determined that there is a problem.

(4) Communication Unit 11A to Communication Unit 11B

Next, a sequence of detecting the problem is executed in the communication unit 11A to the communication unit 11B as shown in FIG. 6 (step S24).

Figure 10:
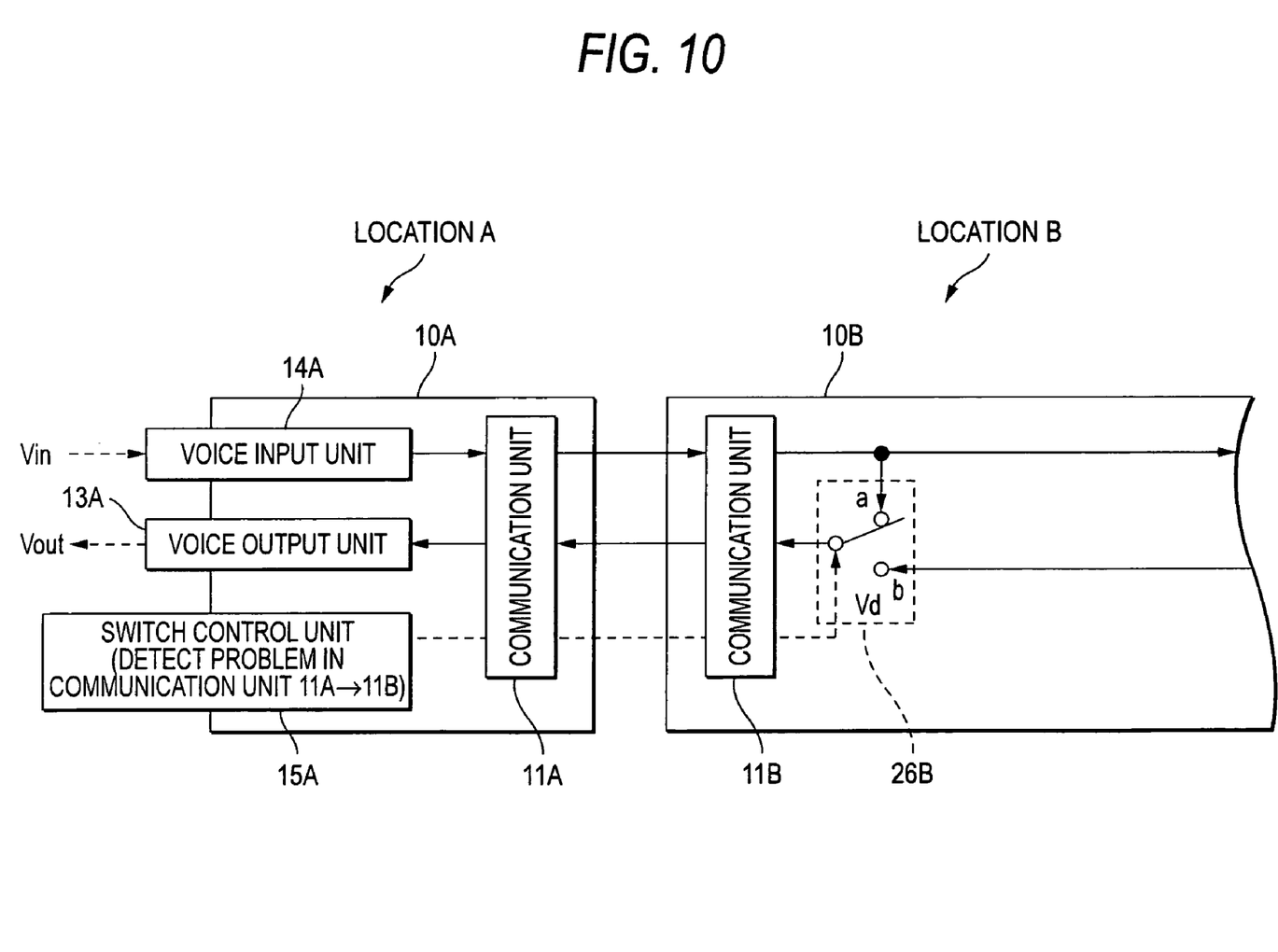
FIG. 10 is a diagram illustrating a method for detecting a problem between the communication units.

FIG. 10 is a diagram illustrating a method of detecting the problem in the communication unit 11A to the communication unit 11B.

When it is determined that there is no problem in the voice output unit 13A, the voice input unit 14A, and the communication 11B to the communication 11A until the check (3), the inputted voice Vin is inputted to the voice input unit 14A to transmit the voice from the communication 11A to the communication unit 11B.

In this event, the switch control unit 15A is controlled, a switch 26B is switched to a, and the voice received by the communication unit 11B is loop-backed to be returned to the communication unit 11A. The voice which is loop-backed and returned is outputted by the voice output unit 13A. The outputted voice Vout and the inputted voice Vin are compared, and then when the difference is in a permissible range, it is determined that there is no problem in the communication unit 11A to the communication unit 11B and when the difference is out of the permissible range, it is determined that there is a problem.

(5) Adaptive Filter 121

Next, a sequence of detecting the problem is executed in the adaptive filer 121 as shown in FIG. 6 (step S25).

In the configuration (FIG. 1) of the present embodiment, when it is not found that there is any problem until the check (4) and the voice level (voice pressure) of the voice signal VAba is larger than 0, that is, when any voice is heard from the voice conference apparatus 10B, but the voice is different from the inputted voice VAa, it can be determined that there is a problem in the adaptive filter 121.

In addition, when it is determined above, it is required that the configuration for practically meeting VAab≈VAb is provided.

(6) Voice Output Unit 13B

Next, a sequence of detecting the problem is executed in the voice output unit 13B as shown in FIG. 6 (step S26).

When it is not found that there is any problem until the check (5), that is, when the voice level (voice pressure) of the voice signal VAba is 0, the switch control unit 15A of the configuration (FIG. 1) according to the embodiment of the invention is controlled, the switch 16B is switched to b, and then it is determined whether or not the voice occurring in the location B is heard.

In this event, when any voice is heard, it can be determined that there is a problem in the voice output 13B and when any voice is not heard, it can be determined that there is a problem in the voice input unit 14B.

Next, a modified example of the described example will be described below.

Figure 11:
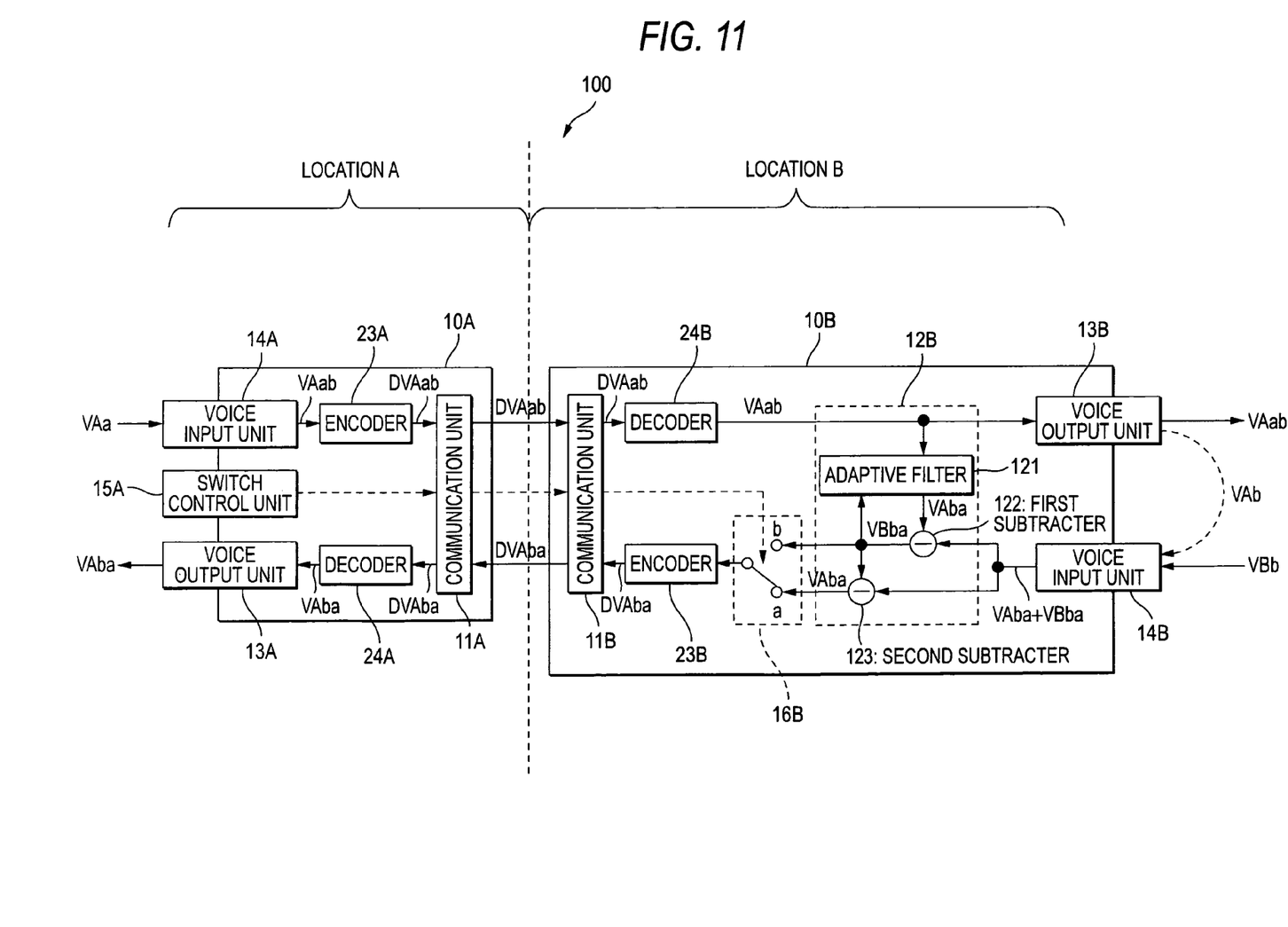
FIG. 11 is a diagram illustrating a configuration of a voice conference system according to a modified example of the embodiment of the invention.

FIG. 11 is a diagram illustrating a configuration of a voice conference system 100 according to the modified example of the embodiment of the invention.

What an analog signal is transmitted according to the above-described example is explained, but as shown in FIG. 11, the modified example in which the inputted voice is digitally encoded to be transmitted to another location is given.

According to the modified example, after the inputted voice signal VAab is digitally encoded by an encoder 23A of the voice conference apparatus 10A at the location A, the digitally encoded data DVAba is transmitted and decoded by a decoder 24B of the voice conference device 10B in the location B. Likewise, the inputted echo component VAba is digitally encoded by the encoder 23B of the voice conference apparatus 10B at the location B and then the digitally encoded data DVAba is transmitted to be decoded by the decoder 24B of the voice conference apparatus 10A in the location A. In such a modified example, the transmitted data is transformed into the digital signal.

According to the modified example, the voices VAa and VAba can be compared at the location A. Accordingly, it is easy to compare the voices VAa and VAba since it is possible that the produced voice does not overlap the inputted voice by delaying time for some while and the like until the voice VAba is outputted by the voice output unit 13A.

As described in detail above, according to the embodiment there is provided a voice conference apparatus 10B including: a communication unit 11B that transmits and receives a first voice signal VAab to and from another apparatus via a network; an voice output unit 13B that reproduces the first voice signal VAab received by the communication unit 11B and outputs the reproduced first voice signal as a first voice VAb; an voice input unit 14B that collects the first voice VAb (echo) and a second voice VBb generated by a voice source, as a second voice signal VAba+VBba; a desired voice extracting unit 12B that separates the second voice signal VAba+VBba into a third voice signal VAba originated from the first voice and a fourth voice signal VBba originated from the second voice VBb; and a selecting unit 16B that selects one of the third voice signal VAba and the fourth voice signal VBba. The communication unit 11B transmits the one of the third voice signal VAba and the fourth voice signal VBba selected by the selecting unit 16B to the other apparatus.

According to the configuration above, in a voice conference system wherein a voice signal is transmitted between the plurality of apparatuses connected via a network, the voice signal VAba of the echo of the inputted voice transmitted from the other location (location A) connected via the network to the other location (location A) can be returned. Therefore, it can be confirmed at the other location (the location A) whether or not a voice with the desired clear quality is reproduced at the location (location B) in which the voice conference apparatus 10B is there.

In addition, according to the embodiment, there is provided a method for confirming a communication in a voice conference system including a voice conference apparatus 10A and a voice conference apparatus 10B connected to the voice conference apparatus 10A via a network. The method includes: collecting a first voice VAa generated from a first voice source around the voice conference apparatus 10A as a first voice signal VAab; transmitting the first voice signal VAab to the voice conference apparatus 10B from the voice conference apparatus 10A; reproducing the transmitted first voice signal VAab by the voice conference apparatus 10B; outputting the reproduced first voice signal VAab as a second voice VAb; collecting the second voice VAb and a third voice VBb generated from a second voice source around the voice conference apparatus 10B as a second voice signal VAba+VBba at the voice conference apparatus 10B; separating the second voice signal VAba+VBba into a third voice signal VAba originated from the second voice VAb and a fourth voice signal VBba originated from the third voice VBb; transmitting the third voice signal VAba to the voice conference apparatus 10A; reproducing the transmitted third voice signal VAba; and determining whether or not the first voice VAa is normally reproduced by the voice conference apparatus 10B by comparing the first voice VAa generated from the first voice source around the voice conference apparatus 10A with the reproduced third voice signal VAba.

According to the configuration, in the voice conference system, the voice inputted from the own location can be confirmed whether or not the voice is reproduced with the desired clear quality in the other location. Accordingly, since it is easy to confirm whether or not the own voice is heard in the other location, the participants' uneasiness over the system in the conference can be removed.

In addition, when the voice conference system is installed, it is required that a person in charge of the work is necessary both at the locations in order to confirm whether or not the voice is heard. However, a person in charge of the confirming work can be stationed only in the single location to treat the work, thereby reducing the burden.

Further, when a problem occurs in the voice conference system, it is easy to detect where the problem is and to specify what the problem is in the voice conference system.

In this manner, in the voice conference system which transmits and receives the voice data to and from the plurality of locations connected via the network, since the voice signal resulting from the echo of the inputted voice transmitted from the other location (own location) connected via the network can return to the other location, it can be confirmed in the other location to which the voice signal is returned whether or not the voice is reproduced with a desired clear voice quality in the location (other location) in which the voice conference apparatus is installed.

In addition, the invention is not limited to the above-described embodiment, but, for example, is also employed as a method for confirming whether or not an own voice is heard to an other party in a TV conference system of an electronic conference system using a terminal connected via a network, a communication line, or the like. Further, the invention can be also applied to a remote class and the like carried out in the remote location via the network, the communication line, or the like.

What is claimed is:

1. A voice conference apparatus comprising:
   a communication unit that transmits and receives a first voice signal to and from another apparatus via a network;
   an output unit that reproduces the first voice signal received by the communication unit and outputs the reproduced first voice signal as a first voice;
   an input unit that collects the first voice and a second voice generated by a voice source, as a second voice signal;
   a separating unit that separates the second voice signal into a third voice signal originated from the first voice and a fourth voice signal originated from the second voice; and
   a selecting unit that selects one of the third voice signal and the fourth voice signal,
   wherein the communication unit transmits the one of the third voice signal and the fourth voice signal selected by the selecting unit to the other apparatus, the voice conference apparatus further comprising:
   a first measuring unit that measures a voice level of the first voice signal received by the communication unit;
     a first adjusting unit that adjusts the voice level of the first voice signal in accordance with the voice level of the first voice signal measured by the first measuring unit;
   a second measuring unit that is disposed near the output unit and measures a voice level of the first voice; and
     a second adjusting unit that adjusts the voice level of the third voice signal in accordance with the voice level of the first voice measured by the second measuring unit.

2. The voice conference apparatus according to claim 1, wherein the selecting unit is capable of being controlled by the other apparatus.

3. The voice conference apparatus according to claim 1, wherein the first voice signal received by the communication unit includes a digital signal.

4. The voice conference apparatus according to claim 3, further comprising:
   a decoding unit that decodes the digital signal; and
   an encoding unit that encodes the one of the first voice signal and the second voice signal selected by the selecting unit into a digital signal.

5. A method for confirming a communication in a voice conference system including a first apparatus and a second apparatus connected to the first apparatus via a network, the method comprising:
   collecting a first voice generated from a first voice source around the first apparatus as a first voice signal;
   transmitting the first voice signal to the second apparatus from the first apparatus;
   reproducing the transmitted first voice signal by the second apparatus;
   outputting the reproduced first voice signal as a second voice;
   collecting the second voice and a third voice generated from a second voice source around the second apparatus as a second voice signal at the second apparatus;
   separating the second voice signal into a third voice signal originated from the second voice and a fourth voice signal originated from the third voice;
   transmitting the third voice signal to the first apparatus;
   reproducing the transmitted third voice signal;
   determining whether or not the first voice is normally reproduced by the second apparatus by comparing the first voice generated from the first voice source around the first apparatus with the reproduced third voice signal;
   measuring a voice level of the first voice signal to be transmitted to the second apparatus at the first apparatus;

measuring a voice level of the first voice signal transmitted to the second apparatus at the second apparatus before the first voice signal is reproduced: and adjusting the voice level of the first voice signal transmitted to the second apparatus in accordance with the measured voice level of the first voice signal to be transmitted and the measured voice level of the transmitted first voice signal.

6. The method according to claim 5, further comprising measuring a voice level of the second voice in the vicinity of a position where the second voice is outputted; and adjusting a voice level of the third voice signal in accordance with the measured voice level of the second voice.

7. A computer program product for enabling a computer to control a voice conference system including a first apparatus and a second apparatus connected to the first apparatus via a network, the computer program product comprising:

software instructions for enabling the computer to perform predetermined operations; and a non-transitory computer readable medium bearing the software instructions, the predetermined operations including:

collecting a first voice generated from a first voice source around the first apparatus and converting into a first voice signal;

transmitting the first voice signal to the second apparatus from the first apparatus;

reproducing the transmitted first voice signal by the second apparatus;

outputting the reproduced first voice signal as a second voice;

collecting the second voice and a third voice generated from a second voice source around the second apparatus as a second voice signal at the second apparatus;

separating the second voice signal into a third voice signal originated from the second voice and a fourth voice signal originated from the third voice;

transmitting the third voice signal to the first apparatus;

reproducing the transmitted third voice signal;

determining whether or not the first voice is normally reproduced by the second apparatus by comparing the first voice generated from the first voice source around the first apparatus with the reproduced third voice signal;

measuring a voice level of the first voice signal to be transmitted to the second apparatus at the first apparatus;

measuring a voice level of the first voice signal transmitted to the second apparatus at the second apparatus before the first voice signal is reproduced; and adjusting the voice level of the first voice signal transmitted to the second apparatus in accordance with the measured voice level of the first voice signal to be transmitted and the measured voice level of the transmitted first voice signal.

* * * * *